L. CUBELIC.
LABYRINTH PACKING.
APPLICATION FILED JUNE 13, 1911.

1,049,811.

Patented Jan. 7, 1913.

Witnesses:
Marcus L. Byng.
J. Ellis Glim.

Inventor,
Ludwig Cubelic,
by Albert H. Davis
Att'y.

UNITED STATES PATENT OFFICE.

LUDWIG CUBELIC, OF CHARLOTTENBURG, GERMANY, ASSIGNOR TO GENERAL ELECTRIC COMPANY, A CORPORATION OF NEW YORK.

LABYRINTH-PACKING.

1,049,811.  Specification of Letters Patent.  Patented Jan. 7, 1913.

Application filed June 13, 1911. Serial No. 632,921.

*To all whom it may concern:*

Be it known that I, LUDWIG CUBELIC, a subject of the King of Prussia, residing at Charlottenburg, Germany, have invented certain new and useful Improvements in Labyrinth-Packings, of which the following is a specification.

The invention relates to labyrinth packing for elastic fluid turbines and has for its object the provision of an improved stuffing box having a divided labyrinth packing that is laterally removable, the stuffing box casing being ordinarily undivided. This object is secured by supporting the packing in the casing by means of seats or shoulders that are suitably spaced apart and increase in diameter from one end of the stuffing box to the other, said seats having a width that is less than one of the packing grooves of the labyrinth packing so that the raising of the parts of the packing within the casing by substantially the height of a packing projection or ring and their subsequent lateral removal are made possible. The use of the narrow seats has the further advantage that the packing on account of the small supporting surfaces cannot burn or rust fast in such a manner as to make it impossible to remove the packing. Nevertheless, by suitably arranging the supporting seats a positioning of the packing is secured which is just as effective as if it were fitted in the casing along its entire surface.

Figure 1:
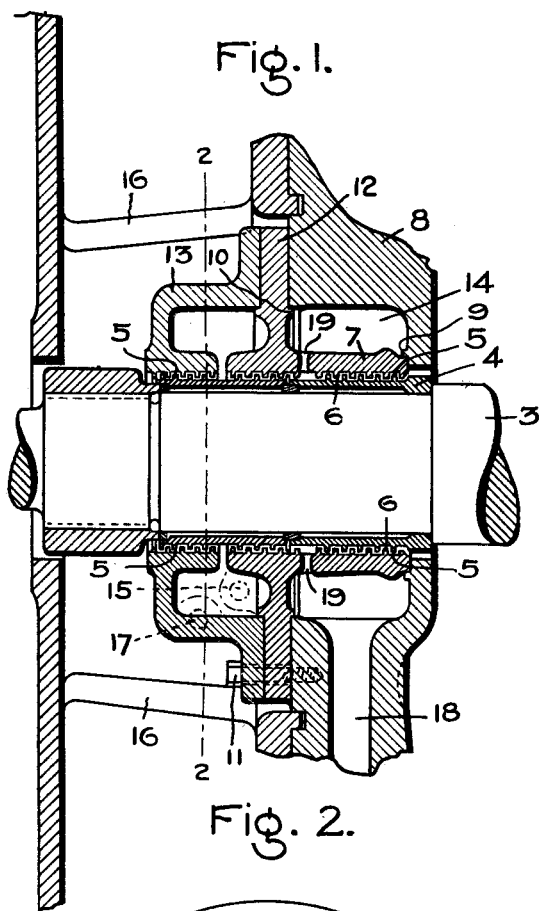
Figure 2:
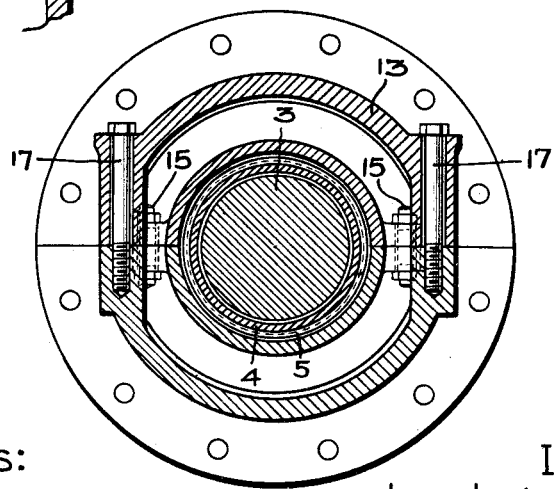

In the accompanying drawing illustrating one of the embodiments of the invention. Figure 1 is a partial longitudinal section of the packing and the casing also showing a portion of the shaft; and Fig. 2 is a section on the line 2—2 of Fig. 1.

Secured to and rotating with a shaft 3 is a sleeve 4 carrying a series of annular projections or rings 5 on its periphery. Arranged in the spaces between the rings 5 is a series of similar rings or projections 6 that are carried by the cylinder 7 that is supported in the casing 8 by the narrow seats 9 and 10 and held against axial movement by the bolts 11 passing through the lateral flange 12 on the cylinder, the bolts 11 also securing an additional packing member 13 to the casing. The seat 10 is made of larger diameter than the seat 9 so that there is a clearance space 14 between the outside of the cylinder or support 7 and the adjacent wall of the casing. A clearance space is also provided between the flange 12 and the adjoining portion of the casing. The diameters of these clearances must be at least sufficiently greater than the diameters of the cylinder and the flange to permit the halves of the packing to be lifted clear of the rings 5 under certain conditions.

Obviously more than two seats can be provided for the packing, if the conditions make it desirable, said seats being arranged at suitable distances apart. The width of the seats must be slightly less than the clearance space between the rings 5 and 6 so that by taking out the bolts 15 that secure the halves of the cylinder 7 together and moving either half axially to free it from its seats, said half can then be lifted clear of the rings 5 and moved axially and laterally to remove it from the casing through the opening 16. Before this is done the packing member 13 must be removed by taking out the bolts 17 that secure the halves of the member together and unscrewing the bolts 11 that attach said halves and the flange 12 to the casing 8. When the bolts have been removed the halves of the member 13 can then be lifted clear of the rings 5 and taken out of the machine. The method of assembling or replacing the packing will be the reverse of the procedure just outlined and will be understood without further explanation.

Elastic fluid can be supplied to the packing through the conduit 18 which opens into the clearance space 14, passages 19 being provided in the cylinder 7 between the clearance space and the packing space. This supply of elastic fluid will assist in preventing leakage along the packing.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

What I claim as new and desire to secure by Letters Patent of the United States is:

1. In a labyrinth packing for a shaft, the combination of a casing, a rotating shaft within the casing, a series of packing rings carried by the shaft, and a divided support carrying a series of packing rings that surround the shaft, the rings of one series projecting into the spaces between the rings of the other series, and the casing being provided with seats for said support that have a width which is less than the difference between the width of a space and a ring.

2. In a labyrinth packing for a shaft, the combination of a casing, a rotating shaft within the casing, a series of packing rings carried by the shaft, and a support made in sections that carries a series of packing rings that surround the shaft, the rings of one series projecting into the spaces between the rings of the other series, and the casing being provided with circular seats for said support that are of different diameters and have a width that is less than the difference between the width of a space and a ring.

3. In a labyrinth packing for a shaft, the combination of a casing, a rotating shaft within the casing, a series of packing rings carried by the shaft, a support made in sections that carries a series of packing rings that surround the shaft, the rings of one series projecting into the spaces between the rings of the other series, there being circular seats of different diameters on the casing for said support that are spaced apart and have a width that is less than the difference between the width of a space and a ring, said diameters increasing progressively from one end of the packing to the other, and means for securing the support against axial movement.

4. In a labyrinth packing for a shaft, the combination of a casing, a rotating shaft within the casing, a series of packing rings carried by the shaft, and a substantially cylindrical support made in sections that carries a series of packing rings that surround the shaft, the rings of one series projecting into the spaces between the rings of the other series, there being circular seats of different diameters on the casing for said support, the width of the seats being less than the difference between the width of a space and a ring, and the diameter of the support between two adjoining seats being less than the diameter of the casing between said seats so that the support is in engagement with the seat portions only of the casing.

5. In a labyrinth packing for a shaft, the combination of a casing, a rotating shaft within the casing, a series of packing rings carried by the shaft, and a cylindrical support made in sections that carries a series of packing rings that surround the shaft, the rings of one series projecting into the spaces between the rings of the other series, there being circular seats of different diameters spaced apart on the casing for said support, the width of the seats being less than the difference between the width of a space and a ring, and a flange on the support, the diameter of the support between adjoining seats and the diameter of the flange being sufficiently less than the diameters of the adjacent portions of the casing to permit the sections of the support to be lifted clear of the rings on the shaft and taken out of the machine after said sections have been moved axially to free them from said seats.

6. In labyrinth packing for a shaft, the combination of a casing, a rotating shaft within the casing, a series of packing rings carried by the shaft, a divided support carrying a series of packing rings that surround the shaft, the rings of one series projecting into the spaces between the rings of the other series, the casing being provided with circular seats for the support that progressively increase in diameter from one end of the packing to the other, and a clearance space being provided between the outer surface of the support between two adjoining seats and the adjacent portion of the casing, and means for supplying elastic fluid to the clearance space, there being passages in the support for conveying said fluid to the packing space.

In witness whereof, I have hereunto set my hand this 27th day of May, 1911.

LUDWIG CUBELIC.

Witnesses:
 FRIEDRICH GANZERT,
 OTTO SCHMID.